US011100892B2

(12) United States Patent
Keith et al.

(10) Patent No.: US 11,100,892 B2
(45) Date of Patent: Aug. 24, 2021

(54) DISPLAY ELEMENT, SYSTEM, AND METHOD

(71) Applicant: Rockwell Collins, Inc., Cedar Rapids, IA (US)

(72) Inventors: Christopher A. Keith, Wilsonville, OR (US); Jana Wills, West Linn, OR (US); Michael Newman, Portland, OR (US); Michael A. Ropers, Cedar Rapids, IA (US); Bobby D. Foote, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 13 days.

(21) Appl. No.: 16/704,322

(22) Filed: Dec. 5, 2019

(65) Prior Publication Data
US 2021/0174764 A1 Jun. 10, 2021

(51) Int. Cl.
*G09G 5/10* (2006.01)
*G02B 27/01* (2006.01)
*G02B 27/00* (2006.01)
*G06F 3/01* (2006.01)

(52) U.S. Cl.
CPC ............ *G09G 5/10* (2013.01); *G02B 27/0093* (2013.01); *G02B 27/0172* (2013.01); *G06F 3/012* (2013.01); *G02B 2027/0178* (2013.01); *G09G 2310/027* (2013.01); *G09G 2320/0626* (2013.01)

(58) Field of Classification Search
CPC .............. G02B 27/017; G02B 27/0093; G02B 27/0172; G02B 2027/0178; G09G 5/10; G09G 2310/027; G09G 2320/0626; G06F 3/012
See application file for complete search history.

(56) References Cited

U.S. PATENT DOCUMENTS

| 8,780,133 | B2 | 7/2014 | Jeong et al. |
| 9,542,885 | B2 | 1/2017 | Wang et al. |
| 9,633,607 | B1 | 4/2017 | Aubert et al. |
| 9,704,927 | B2 | 7/2017 | Wang |
| 9,799,303 | B2 | 10/2017 | Mizukoshi et al. |
| 2012/0299947 | A1 | 11/2012 | Tsuda et al. |
| 2013/0194170 | A1 | 8/2013 | Saitoh et al. |
| 2016/0322001 | A1* | 11/2016 | Do .................. G09G 3/3291 |
| 2016/0342043 | A1 | 11/2016 | Nakanishi et al. |

(Continued)

FOREIGN PATENT DOCUMENTS

EP 1770676 A2 4/2007

OTHER PUBLICATIONS

Partial Search Report for European Application No. 20212006.9 dated Apr. 1, 2021, 11 pages.

*Primary Examiner* — Lixi C Simpson
(74) *Attorney, Agent, or Firm* — Suiter Swantz pc llo

(57) ABSTRACT

A system may include a display element. The display element may include pixel groups. Each of the pixel groups may include: a first sub-pixel configured to output light of a first color; a second sub-pixel configured to output light of a second color; a third sub-pixel configured to output light of a third color; and a fourth sub-pixel configured to output light, wherein the fourth sub-pixel has a maximum brightness that is dimmer than a maximum brightness of each of the first sub-pixel, the second sub-pixel, and the third sub-pixel.

15 Claims, 12 Drawing Sheets

(56) References Cited

U.S. PATENT DOCUMENTS

| | | |
|---|---|---|
| 2018/0040284 A1 | 2/2018 | Kang |
| 2018/0137602 A1 | 5/2018 | Spitzer et al. |
| 2018/0211580 A1 | 7/2018 | Su et al. |
| 2019/0073938 A1 | 3/2019 | Shi |
| 2019/0304387 A1 | 10/2019 | Tomizawa |
| 2019/0385342 A1* | 12/2019 | Freeman ................ A61B 3/113 |
| 2020/0175943 A1* | 6/2020 | Li ............................ G09G 5/02 |
| 2021/0035484 A1* | 2/2021 | Matsueda ............ G09G 3/2003 |

* cited by examiner

DISPLAY ELEMENT, SYSTEM, AND METHOD

BACKGROUND

Improving night vision imaging performance in head worn displays helmet-mounted displays (HMDs), or head-up displays (HUDs) is important for war fighters. There is a desire for white night vision imagery and typical displays rely on colored sub pixels to achieve white. Augmented reality displays also should work in high dynamic range scene brightness environments. Driving a color sub-pixel display across such a large dynamic range can become extremely difficult.

SUMMARY

In one aspect, embodiments of the inventive concepts disclosed herein are directed to a system. The system may include a display element. The display element may include pixel groups. Each of the pixel groups may include: a first sub-pixel configured to output light of a first color; a second sub-pixel configured to output light of a second color; a third sub-pixel configured to output light of a third color; and a fourth sub-pixel configured to output light, wherein the fourth sub-pixel has a maximum brightness that is dimmer than a maximum brightness of each of the first sub-pixel, the second sub-pixel, and the third sub-pixel.

In a further aspect, embodiments of the inventive concepts disclosed herein are directed to a method. The method may include outputting, by a first sub-pixel of a pixel group of a display element, light of a first color. The method may further include outputting, by a second sub-pixel of the pixel group of the display element, light of a second color. The method may further include outputting, by a third sub-pixel of the pixel group of the display element, light of a third color. The method may further include outputting, by a fourth sub-pixel of the pixel group of the display element, light, wherein the fourth sub-pixel has a maximum brightness that is dimmer than a maximum brightness of each of the first sub-pixel, the second sub-pixel, and the third sub-pixel.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
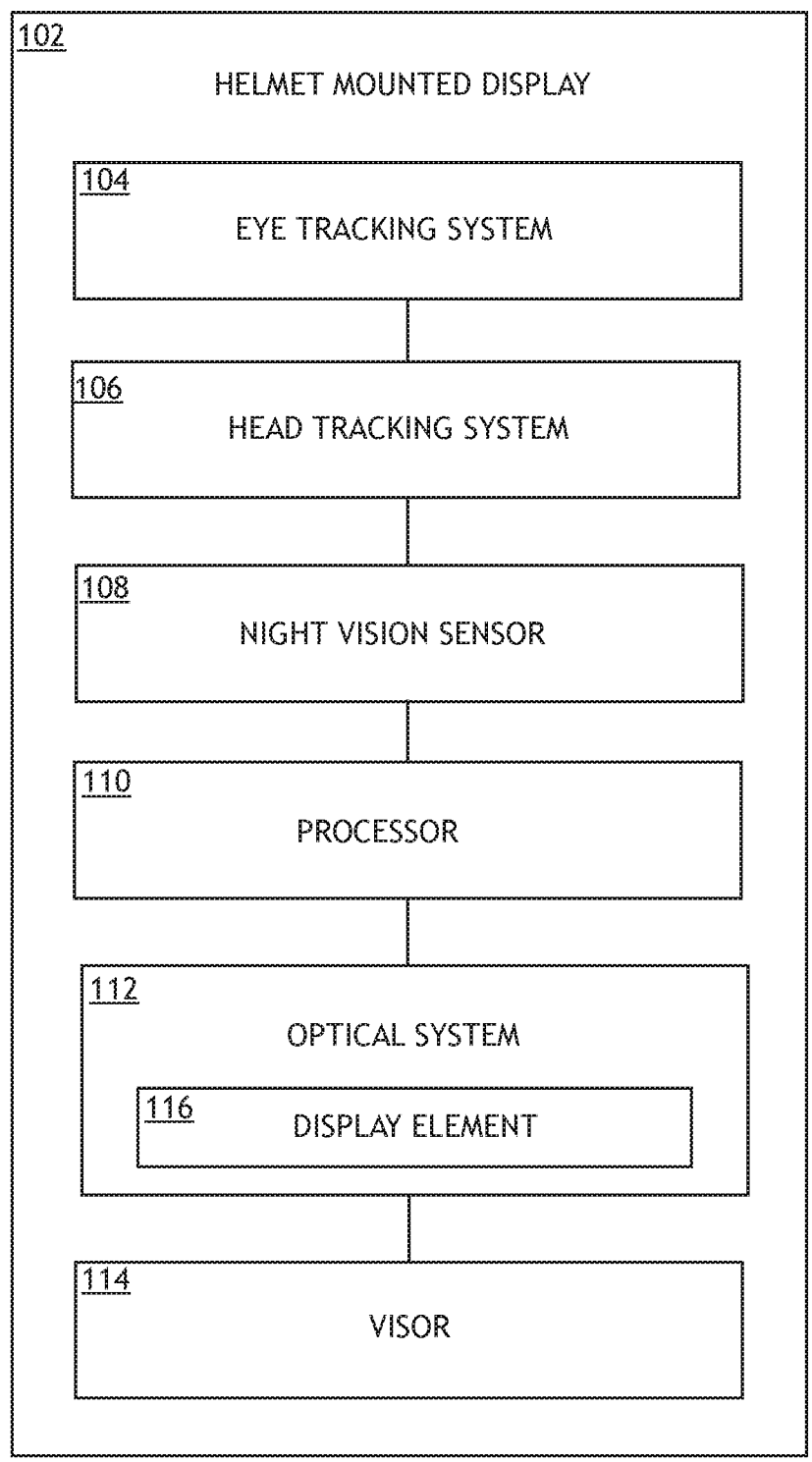
FIG. 1 is a view of an exemplary embodiment of a system including a helmet-mounted display (HMD) according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system including a display element, wherein the display element includes a plurality of pixel groups such that each pixel group has a sub-pixel that has a maximum brightness that is dimmer than a maximum brightness of each of other sub-pixels of the pixel group. Some embodiments may be useful for high dynamic luminance range displays and for augmented reality (AR), virtual reality (VR), and/or mixed reality (MR) systems and displays.

Some embodiments may provide an optimized sub-pixel color architecture for improved MTF for night vision imaging performance in day mode and/or night mode for display elements (e.g., AR display elements and/or VR display elements).

Some embodiments may include a quad red, green, blue, white sub-pixel display with the white sub-pixel optimized for night mode applications, such as presenting digital night vision sensor imagery at the highest MTF possible. Some embodiments may include a quad red, green, blue, green sub-pixel display with the second green sub-pixel optimized for night mode applications, such as presenting digital night vision sensor imagery at the highest MTF possible. Some embodiments may overcome the difficulty in driving solid-state lighting/displays to extremely low levels as the solid-state lighting/displays start to become unstable. Some embodiments may allow for a highest contrast display of white imagery along with an increased MTF of displayed sensor imagery to a user. In some embodiments, benefits may include creating a display with a constant white point across all brightness levels in night mode as well as a consistent gamma correction at the lowest luminance levels.

Some embodiments may include a sub-pixel architecture optimized to provide a best night time/low luminance display performance for a grayscale (e.g., white grayscale or green grayscale) display image. For example, such sub-pixel architecture may provide: consistent gamma and color coordinate over a high dynamic luminance range (e.g., 1,000 foot Lamberts (fL) down to 0.01 fL (100,000:1)); maximized MTF performance by utilizing sub-pixel resolutions; and/or best possible rendering of sensor video inputs. In some embodiments, the sub-pixel architecture for a color display may be optimized to provide a highest brightness display possible during day mode while still providing an ability to generate a white image for night vision scenery at a best possible MTF (resolution) and lowest brightness possible. Some embodiments may include a video drive scheme for minimizing bandwidth required for the sub-pixel architecture.

Typically, displays (e.g., AR displays) for head wearable devices (HWDs) (e.g., HMDs and near-eye displays) and head-up displays (HUDs) require very bright displays in order to be seen against sunlit outdoor environments such as a white cloud, blue sky or even the ground. Typically, these displays need to be able to operate in extremely dark environments, which can necessitate the need of a high dynamic brightness range (e.g., 100,000:1) for the displays. In some cases, improved display image performance may be required in a low ambient luminance; for example, if the display has a red green blue (RGB) sub-pixel arrangement, the display may require the entire pixel (e.g., the red, green, and blue sub-pixels) to be illuminated to display white imagery with no gain in imaging performance. Typical aerospace applications use green as the primary color for displays in order to make the image easier to see by the human eye, due to the sensitivity of the eye being centered on the green portion of the visible light spectrum. There is a desire to use white for many nighttime/night vision applications, but at low luminance levels it can be hard to control the device for a consistent and uniform display. Sensor systems that input video imagery into an AR display in low ambient conditions can require the display to be driven at very low brightness levels while still being able to accurately represent the sensor inputs. Furthermore, additional sub-pixels may increase video bandwidth required to drive the display.

Currently, common sub-pixel architectures are RGB stripes and red green blue green (RGBG) checkerboards. However, these currently implemented arrangements do not lend themselves to being able to drive a smaller pixel for night operations and still achieve a small color pixel (e.g., a white or green sub-pixel) for a given resolution display. Currently, achieving color balance at low brightness levels poses a significant challenge due to the inability to control solid state lighting at such low levels. Currently, achieving a consistent gamma at low luminance levels for white poses a significant challenge due to the inability to control solid state lighting at such low levels. Currently, increases in subpixels increases required video bandwidth.

Some embodiments may include a display element having a plurality of pixel groups such that each pixel group has a sub-pixel that has a maximum brightness that is dimmer than a maximum brightness of each of other sub-pixels of the pixel group. For example, the dimmer sub-pixel may be a white sub-pixel of a red green blue white (RGBW) or a red green blue green white (RGBGW) sub-pixel architecture. The white sub-pixel may have multiple benefits for operating a display in night mode (e.g., for night vision video). For example, the white sub-pixel may allow for maintaining white balance over a brightness range without the need to for color balancing, which would be necessary with an RGB sub-pixel architecture. For example, the white sub-pixel may allow for simplified gamma correction as gamma correction may only be required for the white channel (as long as video is only displayed in white). For example, the white sub-pixel may allow for <25% pixel active area to be on, which may simplify brightness control at minimum night luminance settings; for example, controlling of dimming at low end for current implementations can be difficult for organic light-emitting diode (OLED) and active-matrix liquid-crystal display (AMLCD)/light-emitting diode (LED) technology without relying on subpixel drive. For example, the white sub-pixel may allow for a luminance increase of monochrome colors by driving the white sub-pixel with the red, green, and blue sub-pixels to provide RGB plus white (RGB+W) video, such that color may be less saturated with increased brightness. For example, the white sub-pixel may allow for improved night mode MTF performance in both horizontal and vertical axes. For example, the white sub-pixel may allow for a reduction in video bandwidth required for a white display since only one subpixel would be driven, as compared to driving three sub-pixels to display white color for an RGB arrangement. Additionally, for example, the dimmer sub-pixel may be a second green sub-pixel of a red green blue green (RGBG) sub-pixel architecture.

Typically, meeting a brightness requirement for night vision scenes down to 0.01 fL can be a challenge for OLED and LED displays. Typically, each sub-pixel has diode characteristics and requires a forward biased voltage to begin to illuminate the display. Typically, there is too small of a margin between the forward bias and the actual voltage required to illuminate the display at very low light levels. This can result in the use of additional sub-pixel drive schemes such as pulse width modulation (PWM) that can create complexity in the design.

Some embodiments take advantage of the dimmer sub-pixel (e.g., a dimmer white or green sub-pixel) to improve night vision video scenes. For example, to meet a low light video scene requirement, the dimmer sub-pixel may have less efficiency than other sub-pixels of a pixel group. Reducing the efficiency of the dimmer sub-pixel may increase the margin between the forward bias voltage and the voltage required for the first shade of gray (SOG) (e.g., 0.01 ftL). This may result in a more stable design with less complexity. For example, some embodiments may reduce the efficiency of the dimmer sub-pixel such that when driven just above the minimum drive voltage, the output may fall below threshold brightness requirement (e.g., a 0.01 fL). For example, this may provide a larger voltage gap between the forward bias and minimum drive voltages and may simplify control of pixel brightness.

Some embodiments may provide a sub-pixel that has a maximum brightness that is dimmer than a maximum brightness of each of other sub-pixels of the pixel group by including any of various means of reducing the luminous efficacy of the dimmer sub-pixel (e.g., a white or green sub-pixel) as compared to the luminous efficacy of the other sub-pixels of a pixel group. Luminous efficacy is the ratio of luminous flux to electrical input power with units of Lumens per Watt. For example, dimming the dimmer sub-pixel may be achieved by: reducing an emitter area of the dimmer sub-pixel to smaller than the dimmer sub-pixel area; applying a mask layer to the dimmer sub-pixel to partially block light; applying a filter (e.g., an organic filter or an inorganic filter) material, which may be polarization sensitive or insensitive, to attenuate light; reducing the effective size of a drive transistor in the dimmer sub-pixel; adding absorbing particles, such as phosphor or quantum dots, to the emitting surface of the dimmer sub-pixel to reduce overall transmission of light; and/or treating the emitting surface of the dimmer sub-pixel, such as to form microstructures, to prevent light from exiting. For example, by reducing the brightness of the dimmer sub-pixel, additional margin may be created between the forward bias voltage and drive voltage. This margin may allow the system to generate sufficient shades of gray (SOG) (e.g., 16 SOG) to the eye under low luminance conditions. In some embodiments, the dimmer sub-pixel may be able to achieve a minimum luminance level of 0.001 fL.

Figure 3:
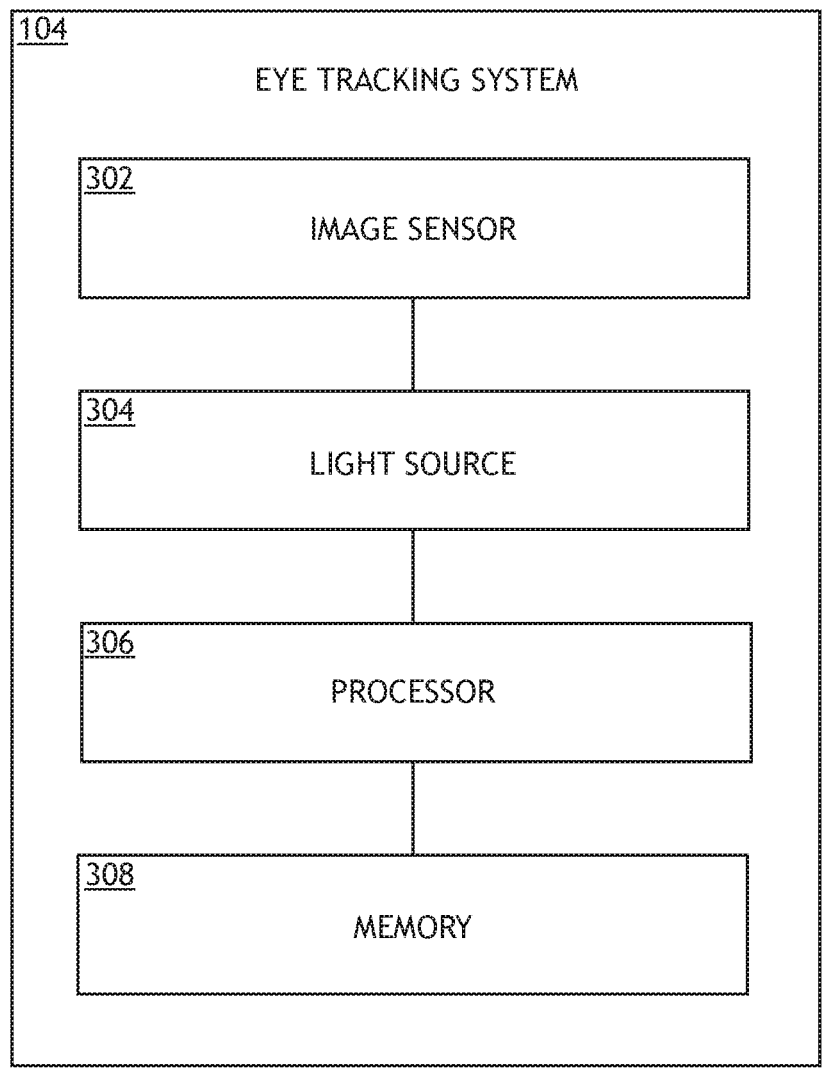
FIG. 3 is a view of the eye tracking system of FIGS. 1-2 according to the inventive concepts disclosed herein.
Figure 4:
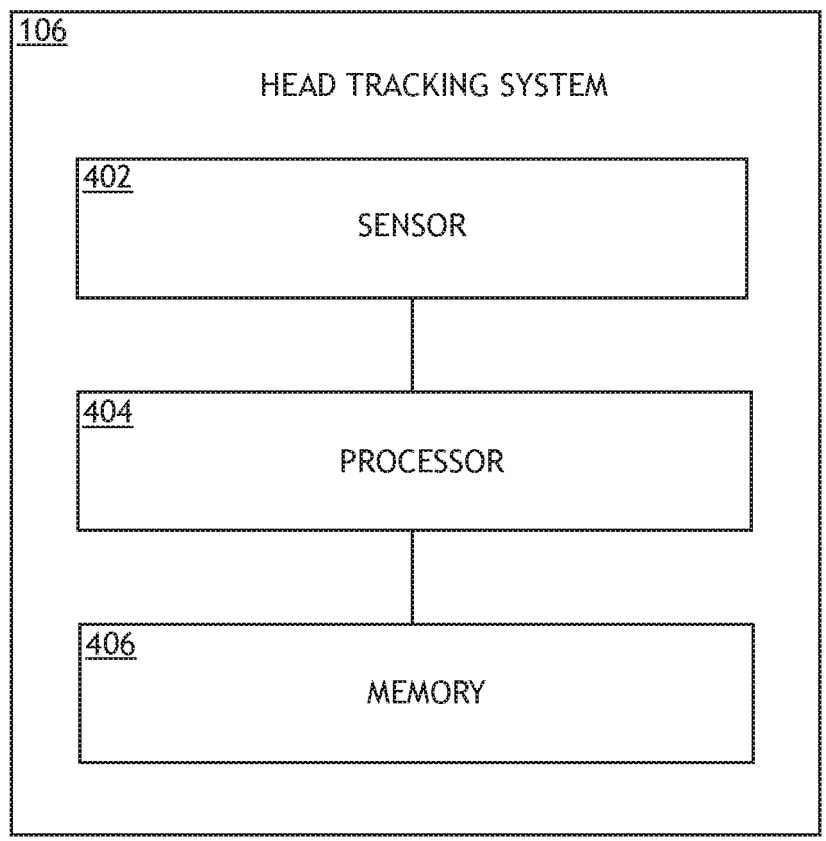
FIG. 4 is a view of the head tracking system of FIGS. 1-2 according to the inventive concepts disclosed herein.
Figure 5:
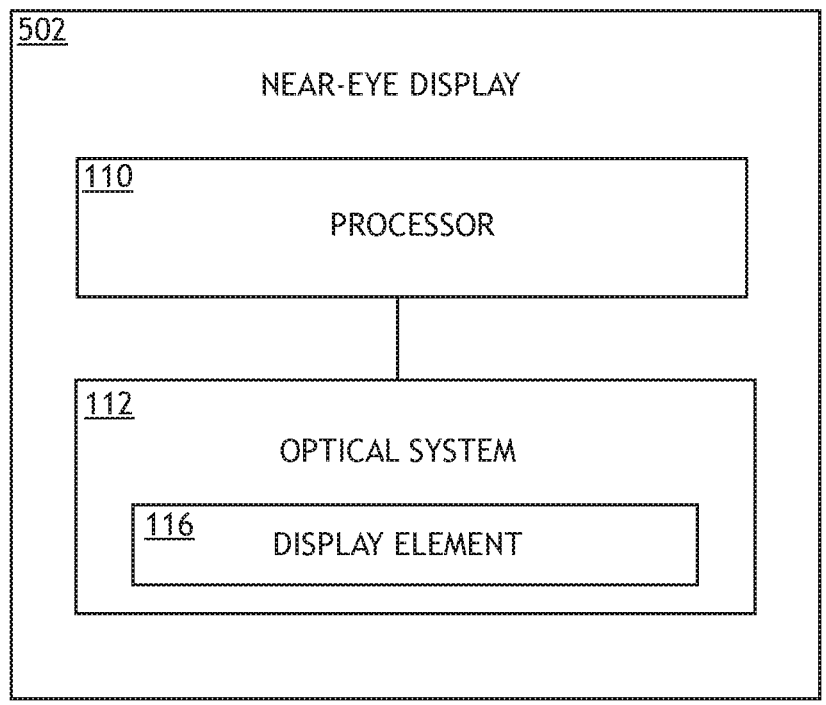
FIG. 5 is a view of an exemplary embodiment of a system including a near-eye display according to the inventive concepts disclosed herein.

Referring now to FIGS. 1-4, an exemplary embodiment of a system 100 according to the inventive concepts disclosed herein is depicted. The system 100 may be implemented as any suitable system, such as a vehicle (e.g., an aircraft (e.g., an airplane and/or helicopter), a watercraft, a submersible craft, an automobile, or a train), a wearable system, and/or a work station. For example, as shown in FIG. 1, the system 100 may include at least one head wearable device (e.g., HMD 102, an AR headset, or a near-eye display (e.g., 502 as shown in FIG. 5)); while some embodiments may include the HMD 102, other embodiments may include one or more elements of the HMD 102 implemented without the HMD 102 or in another device. In some embodiments, the HMD 102 may include at least one eye tracking system 104, at least one head tracking system 106, at least one night vision sensor 108, at least one processor 110, at least one optical system 112, and at least one visor 114, some or all of which may be communicatively coupled at any given time.

Figure 2:
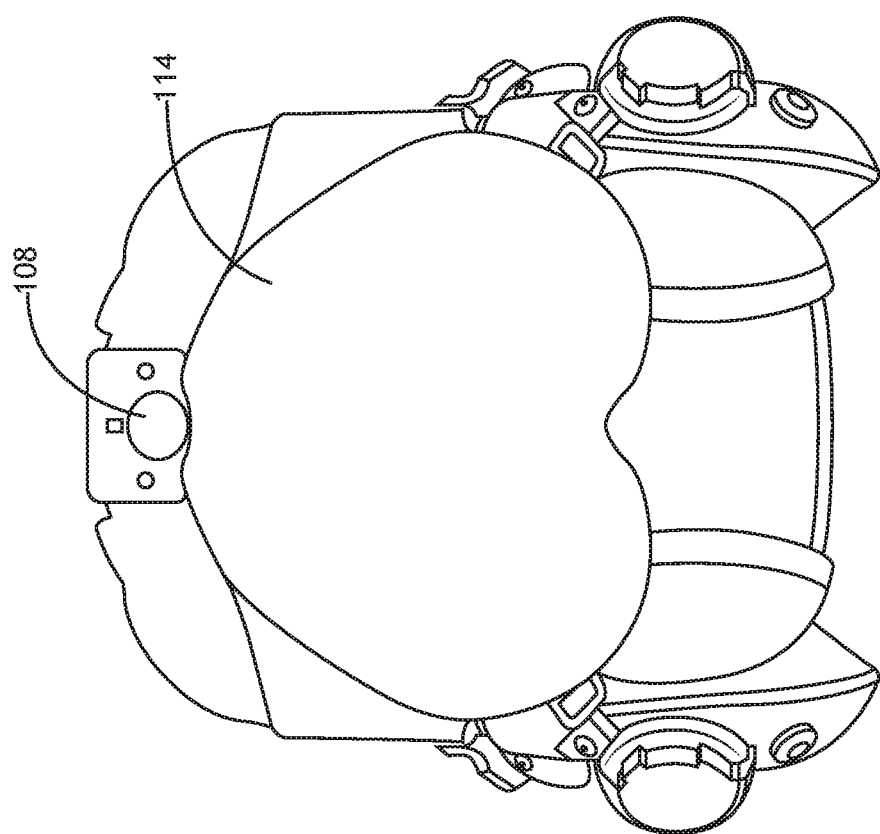
FIG. 2 is a view of the HMD of FIG. 1 according to the inventive concepts disclosed herein.

The HMD 102 may be implemented as any suitable HMD in any suitable environment. For example, as shown in FIG. 2, the HMD 102 may be implemented as a lightweight, wide field of view (FOV), off-the-visor HMD with an integrated night vision system that may provide a user with unparalleled and intuitive access to flight, navigation, tactical, and/or sensor information that may, for example, be displayed on the visor 114.

The eye tracking system 104 may include at least one infrared light source 302 (e.g., at least one infrared light emitting diode (LED)), at least one infrared image sensor 304, at least one processor 306, and at least one memory 308, as well as other components, equipment, and/or devices commonly included in an eye tracking system, some or all of which may be communicatively coupled at any time, as shown in FIG. 3. The eye tracking system 104 may be configured to track eye gestures, track movement of a user's eye, track a user's gaze, and/or otherwise receive inputs from a user's eyes. The eye tracking system 104 may be configured for performing fully automatic eye tracking operations of users in real time.

The infrared light source 302 may be configured to emit infrared light onto an environment onto at least one eye of a user.

The infrared sensitive image sensor 304 may be configured to capture images of the environment illuminated by the infrared light source 302.

The processor 306 may be configured to process data received from the infrared sensitive image sensor 304 and output processed data to one or more devices or systems of the HMD 102 and/or the system 100. For example, the processor 306 may be configured to generate eye tracking data and output the generated eye tracking data to one of the devices (e.g., the processor 110) of the HMD 102 and/or the system 100. The processor 306 may be configured to run various software applications or computer code stored (e.g., maintained) in a non-transitory computer-readable medium (e.g., memory 308) and configured to execute various instructions or operations. The processor 306 may be implemented as a special purpose processor configured to execute instructions for performing (e.g., collectively performing if more than one processor) any or all of the operations disclosed throughout. For example, the processor 306 may be configured to: receive image data from the infrared sensitive image sensor 304; track movement of at least one eye of a user based on the image data; and/or output eye tracking system data indicative of the tracked movement of the at least one eye of the user. For example, the processor 306 may be configured to: perform visor distortion correction operations; perform eye mapping and alignment operations; output, via at least one data connection, eye tracking system data (e.g., indicative of eye azimuth and/or elevation) to an aircraft interface, simulator interface, and/or other computing device of the system; and/or perform a head tracking translation operation.

The head tracking system 106 may have optical, magnetic, and/or inertial tracking capability. The head tracking system 106 may include at least one sensor 402, at least one processor 404, and at least one memory 406, as well as other components, equipment, and/or devices commonly included in a head tracking system, some or all of which may be communicatively coupled at any time, as shown in FIG. 4. The at least one sensor 402 may be at least one optical sensor (e.g., an optical infrared sensor configured to detect infrared light), at least one magnetic sensor, and/or at least one inertial sensor. The head tracking system 106 may be configured to determine and track a position and an orientation of a user's head relative to an environment. The head tracking system 106 may be configured for performing fully automatic head tracking operations in real time. The processor 404 of the head tracking system 106 may be configured to process data received from the sensors 402 and output processed data to one of the computing devices of the system and/or the processor 110 for use in generating images aligned with the user's field of view, such as augmented reality or virtual reality images aligned with the user's field of view to be displayed by the optical system 112 onto the visor 114. For example, the processor 404 may be configured to determine and track a position and orientation of a user's head relative to an environment. Additionally, for example, the processor 404 may be configured to generate position and orientation data associated with such determined information and output the generated position and orientation data. The processor 404 may be configured to run various software applications or computer code stored in a non-transitory computer-readable medium (e.g., memory 406) and configured to execute various instructions or operations. The at least one processor 404 may be implemented as a special purpose processor configured to execute instructions for performing (e.g., collectively performing if more than one processor) any or all of the operations disclosed throughout.

The night vision image sensor 108 (e.g., a night vision camera) may be configured to capture night vision images of the environment. In some embodiments, the night vision image sensor 108 may be configured to detect infrared light. In some embodiments, the night vision image sensor 108 may be configured to output night vision image data to the processor 110, which may output the images to the optical system 112 to be displayed onto the visor 114.

The at least one processor 110 may be implemented as any suitable processor(s), such as at least one general purpose, at least one image processor, at least one graphics processing unit (GPU), and/or at least one special purpose processor, configured to execute instructions for performing (e.g., collectively performing if more than one processor) any or all of the operations disclosed throughout. In some embodiments, the processor 110 may be communicatively coupled to the display element 116. For example, the processor 110 may be configured to: receive the eye tracking system data; receive the head tracking system data; receive the night vision image data; generate and/or output synthetic vision system image data to the optical system 112, for example, based on the eye tracking system data and/or the head tracking system data; generate and/or output night vision image data to the optical system 112, for example, based on the eye tracking system data and/or the head tracking system data; generate and/or output augmented reality and/or virtual reality image data to the optical system, for example, based on the eye tracking system data and/or the head tracking system data; and/or generate and/or output other image data, which may include vehicle operation (e.g., flight) information, navigation information, tactical information, and/or sensor information to the optical system 112, for example, based on the eye tracking system data and/or the head tracking system data.

The optical system 112 may be configured to receive image data from the processor 110 and project images onto the visor 114 for display to the user. The optical system 112 may include at least one display element 116. While the display element 116 is exemplarily depicted and described as being part of the optical system 112, in some embodiments, the display element 116 may be used in other display applications that do not include a optical system. In some embodiments, the optical system 112 may take the display element 116 as an input and transfer, translates, and/or form an image to the correct size and/or orientation for the user to view the information. In some embodiments, the optical system 112 may include at least one lens, at least one mirror, diffraction gratings, at least one polarization sensitive component, at least one beam splitter, at least one combiner, at least one waveguide, at least one light pipe, at least one window, and/or the display element 116. For example, the optical system 112 may include a collimator. For example, the optical system 112 may include a relay lens. For example, the optical system 112 may include a collimator and a combiner (e.g. a flat combiner). For example, the optical system 112 may include a relay lens and a combiner (e.g., a curved combiner). For example, the optical system 112 may include a prism collimator and a beam splitter. For example, the optical system 112 may include collimator and a waveguide (e.g., a diffractive, mirror, or beam splitter based waveguide).

In some embodiments, the display element 116 may be an emissive display element, such as an OLED or micro-LED display element. In some embodiments, the display element 116 may include red, green, blue, and white sub-pixels. In some embodiments, the display element 116 may include red, green, and blue sub-pixels, such as in a RGBG sub-pixel architecture. For example, the display element 116 may have an RGBW or an RGBGW sub-pixel architecture. The display element 116 may be configured to display RGB images and/or video, RGB+W images and/or video, RGB+G images and/or video, and/or grayscale (e.g., white grayscale or green grayscale) images and/or video.

The display element 116 may include a plurality of pixel groups 710. As used throughout, a pixel group is a group of sub-pixels. For example, each of the plurality of pixel groups 710 may include a plurality (e.g., at least four) of sub-pixels 702, 704, 706, 708. For example, a first sub-pixel 702 may be configured to output light of a first color; a second sub-pixel 704 may be configured to output light of a second color; a third sub-pixel 706 may be configured to output light of a third color; and a fourth sub-pixel 708 may be configured to output light. In some embodiments, the fourth sub-pixel 708 may have a maximum brightness that is dimmer than a maximum brightness of each of the first sub-pixel 702, the second sub-pixel 704, and the third sub-pixel 706. For example, the fourth sub-pixel 708 may have a maximum brightness that is at least four times dimmer than a maximum brightness of each of the first sub-pixel 702, the second sub-pixel 704, and the third sub-pixel 706. In some embodiments, the fourth sub-pixel 708 may be a white sub-pixel configured to output white light. In some embodiments, the fourth sub-pixel 708 may be a green sub-pixel configured to output green light. However, in other embodiments, the fourth sub-pixel 708 may be any suitable color. In some embodiments, the first sub-pixel 702 may be a red sub-pixel configured to output red light; however, in other embodiments, the first sub-pixel 702 may be any suitable color. In some embodiments, the second sub-pixel 704 may be a green sub-pixel configured to output green light; however, in other embodiments, the second sub-pixel 704 may be any suitable color. In some embodiments, the third sub-pixel 706 may be a blue sub-pixel configured to output blue light; however, in other embodiments, the third sub-pixel 706 may be any suitable color.

Additionally, for example, the processor 110 may be further configured to: receive grayscale video, such as from the night vision sensor 108; and drive some or all of the fourth sub-pixels 708 corresponding to the grayscale (e.g., white grayscale or green grayscale) video such that grayscale images are displayed by the display element 116.

Additionally, for example, the processor 110 may be further configured to: receive red green blue (RGB) video; encode the RGB video as grayscale video; and drive some or all of the fourth sub-pixels 708 corresponding to the grayscale video such that grayscale images are displayed by the display element 116.

Additionally, for example, the processor 110 may be further configured to: receive red green blue (RGB) video; encode the RGB video as grayscale video; and drive some or all of the red, green, and blue pixels 702, 704, 706 corresponding to the RGB video and some or all of the fourth sub-pixels 708 corresponding to the grayscale video such that enhanced RGB plus grayscale images are displayed by the display element 116.

Additionally, for example, the processor 110 may be further configured to: operate in a day mode (e.g., for operating in a high luminance environment) and a night mode (e.g., for operating with night vision video in a low luminance environment). When in the day mode, the at least one processor 110 may be further configured to: receive red green blue (RGB) video, encode the RGB video as grayscale video, and drive some or all of the red, green, and blue pixels 702, 704, 706 corresponding to the RGB video and some or all of the fourth sub-pixels 708 corresponding to the grayscale video such that enhanced RGB plus grayscale images are displayed by the display element 116. When in the night mode, the at least one processor 110 may be further configured to: receive night vision grayscale video, and drive some or all of the fourth sub-pixels 708 corresponding to the night vision grayscale video such that night vision grayscale images are displayed by the display element 116.

Referring now to FIG. 5, an exemplary embodiment of a system according to the inventive concepts disclosed herein is depicted. The system may be implemented as any suitable system, such as a vehicle (e.g., an aircraft (e.g., an airplane and/or helicopter), a watercraft, a submersible craft, an automobile, or a train), a wearable system, and/or a work station. For example, as shown in FIG. 5, the system may include at least one near-eye display 502. In some embodiments, the near-eye display 502 may include some or all of the elements of the HMD 102 of FIG. 1, and such elements may function similarly as described with respect to the HMD 102 of FIG. 1.

Figure 6:
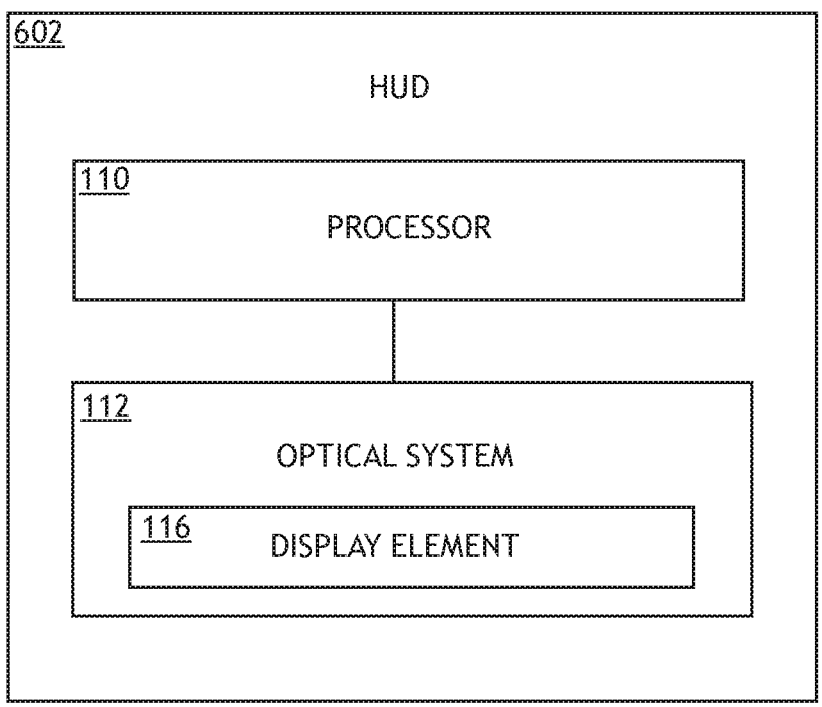
FIG. 6 is a view of an exemplary embodiment of a system including a head-up display (HUD) according to the inventive concepts disclosed herein.

Referring now to FIG. 6, an exemplary embodiment of a system according to the inventive concepts disclosed herein is depicted. The system may be implemented as any suitable system, such as a vehicle (e.g., an aircraft (e.g., an airplane and/or helicopter), a watercraft, a submersible craft, an automobile, or a train), a wearable system, and/or a work station. For example, as shown in FIG. 6, the system may include at least one HUD 602. In some embodiments, the HUD 602 may include some or all of the elements of the HMD 102 of FIG. 1, and such elements may function similarly as described with respect to the HMD 102 of FIG. 1.

Figure 7A:
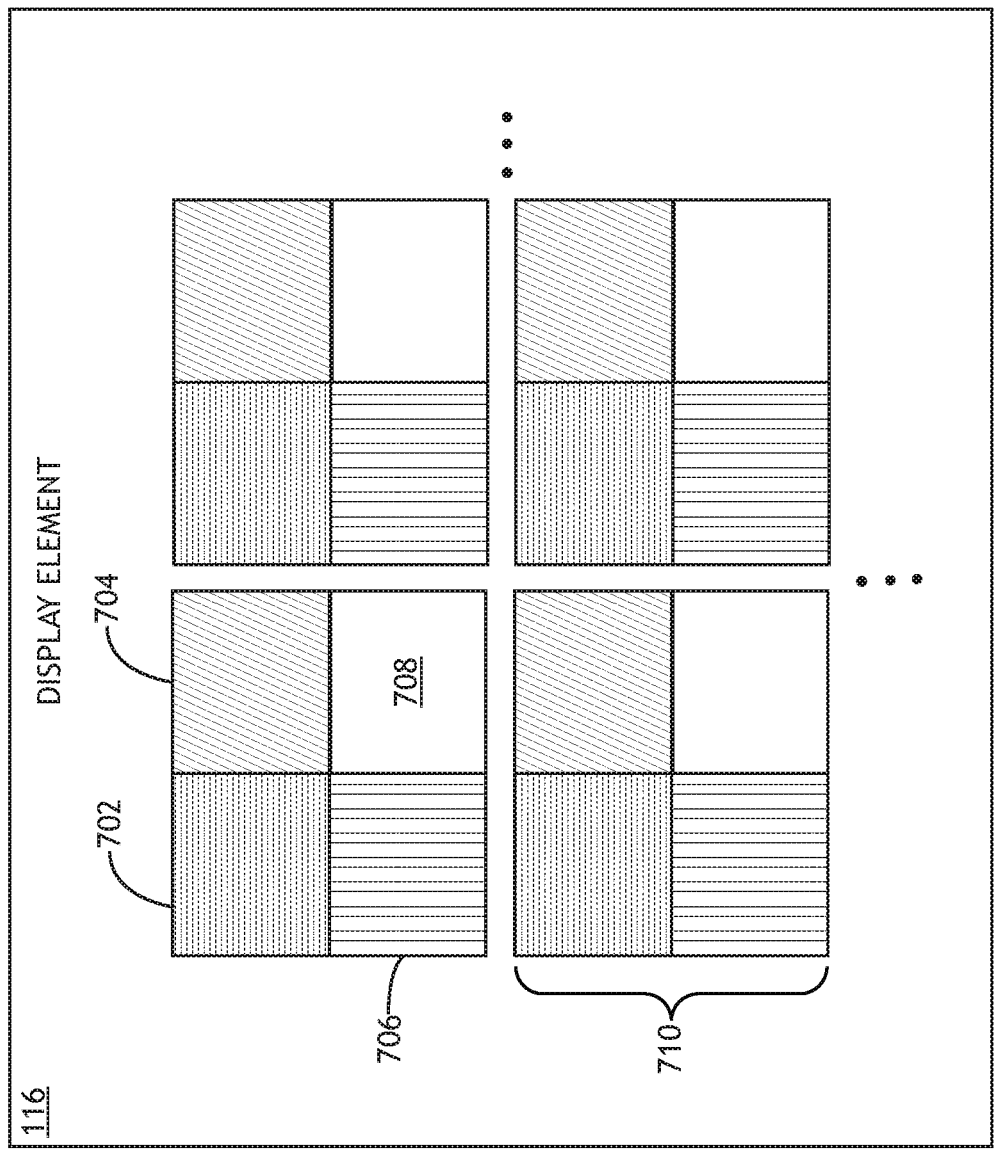
FIGS. 7A, 7B, and 7C depict exemplary embodiments of the display element of FIGS. 1, 5, and 6 according to the inventive concepts disclosed herein.
Figure 7B:
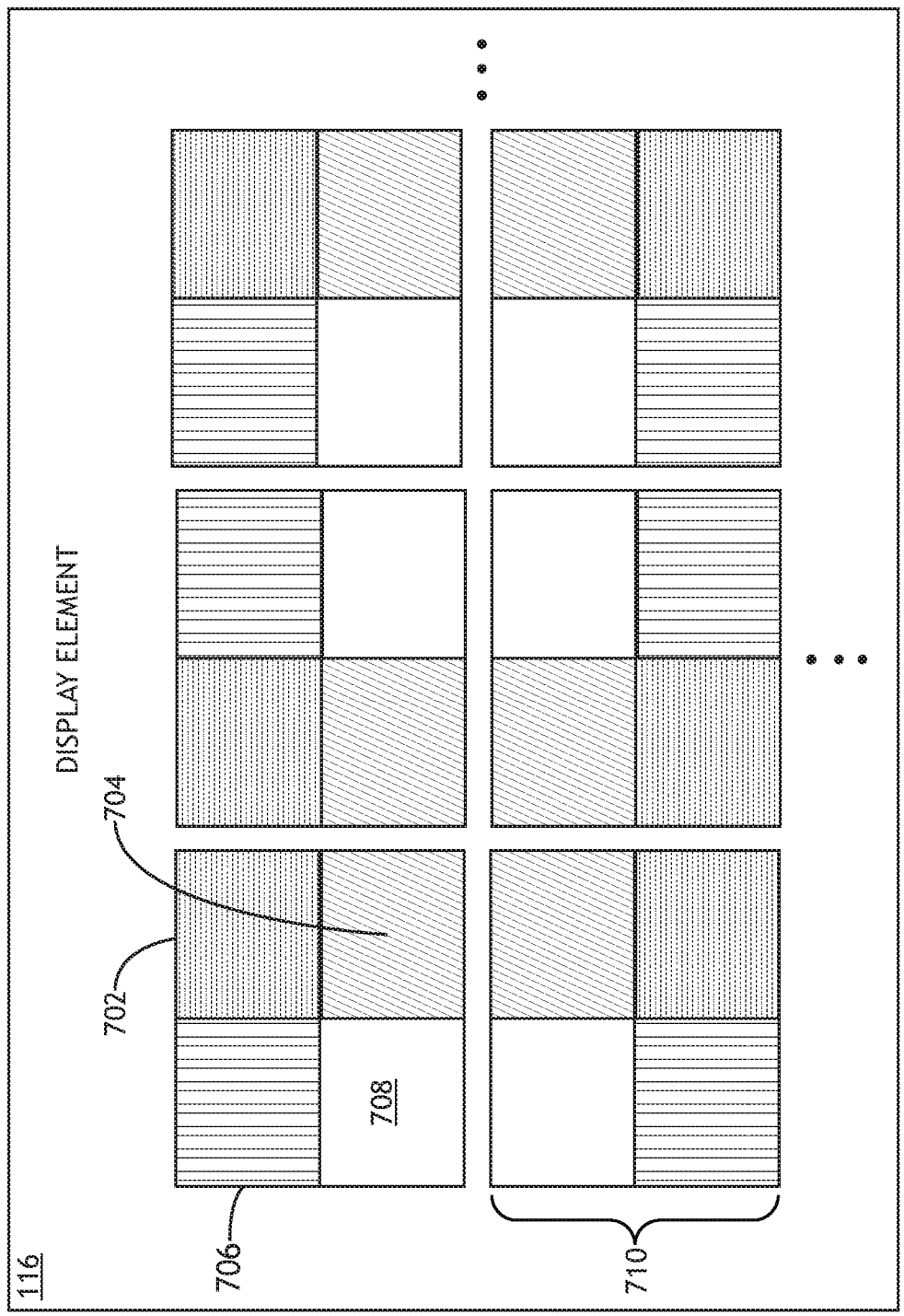
Figure 7C:
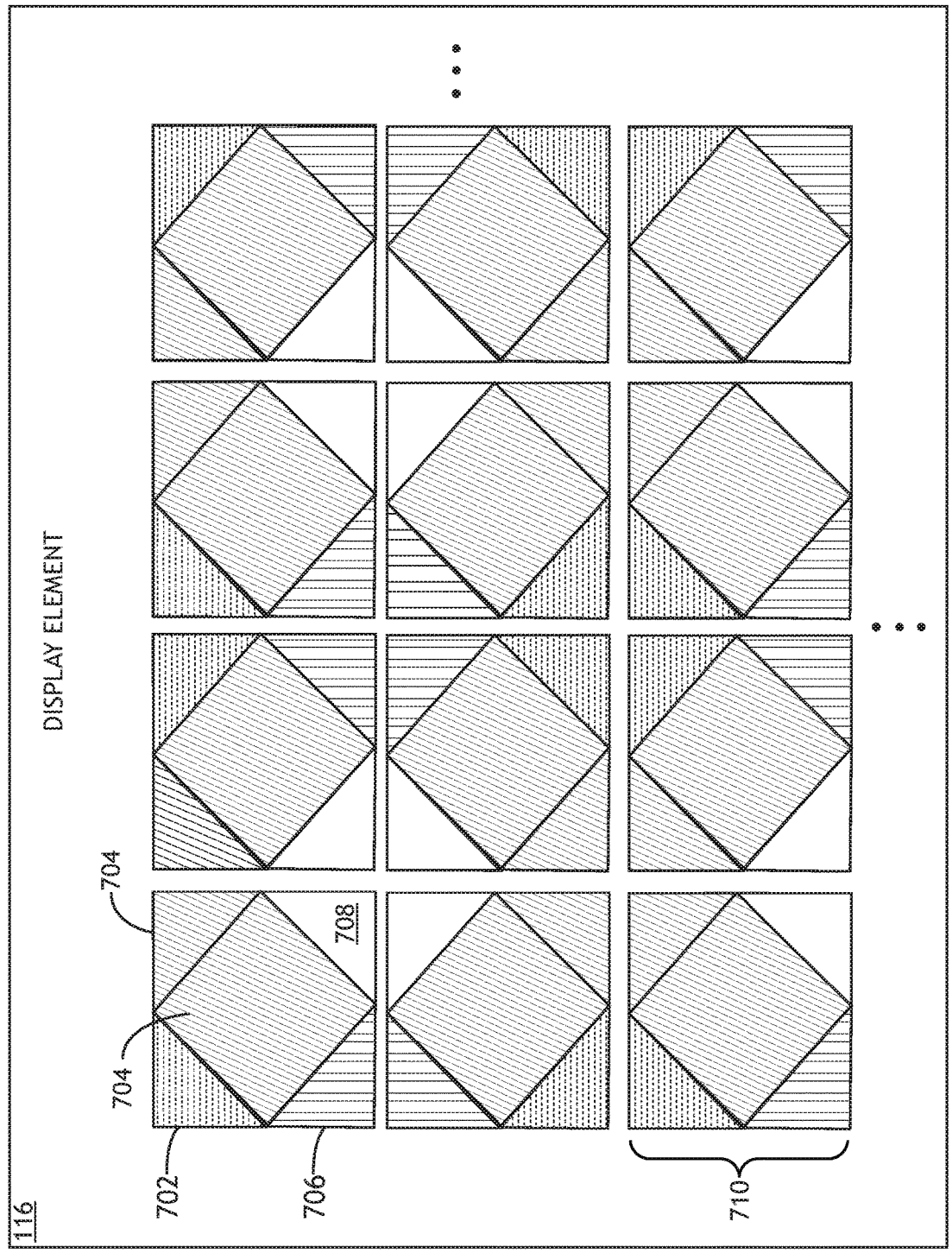

Referring now to FIGS. 7A-C, exemplary embodiments of the display element 116 according to the inventive concepts disclosed herein are depicted. For example, the display element 116 may have any suitable sub-pixel architecture.

As shown in FIG. 7A, the display element 116 may have a tiled four sub-pixel architecture. For example, each pixel group 710 may include red, green, blue, and white sub-pixels 702, 704, 706, 708. In some embodiments, such an architecture may allow for a small white sub-pixel 708. In some embodiments, such an architecture may allow low luminance applications (e.g., night vision video applications) needing white to drive just the white sub-pixels 708, which may maximize image performance and MTF performance. In some embodiments, such an architecture may allow for the red, green, blue, and white sub-pixels 702, 704, 706, 708 to all be driven to a same size line widths. In some embodiments, such an architecture may allow for reduced video bandwidth for white only display. Additionally, in some embodiments, each pixel group 710 may include red, green, blue, and green sub-pixels with the second green sub-pixel dimmer than the other sub-pixels.

As shown in FIG. 7B, the display element 116 may have a tiled four sub-pixel rotated architecture. For example, each pixel group 710 may include red, green, blue, and white sub-pixels 702, 704, 706, 708. In some embodiments, such an architecture may allow for a small white sub-pixel 708. In some embodiments, such an architecture may allow low luminance applications (e.g., night vision video applications) needing white to drive just the white sub-pixels 708. In some embodiments, such an architecture may allow for the red, green, blue, and white sub-pixels 702, 704, 706, 708 to all be driven to a same size line widths. In some embodiments, such an architecture may allow for reduced video bandwidth for white only display. In some embodiments, such an architecture may allow for increased perceived brightness of primary display colors since adjacent sub-pixels can be driven to make sub-pixels look larger. In some embodiments, such an architecture may reduce effective resolution from a sub-pixel drive standpoint. Additionally, in some embodiments, each pixel group 710 may include red, green, blue, and green sub-pixels with the second green sub-pixel dimmer than the other sub-pixels.

As shown in FIG. 7C, the display element 116 may have a tiled five sub-pixel architecture. For example, each pixel group 710 may include red, two green, blue, and white sub-pixels 702, 704, 706, 708. In some embodiments, such an architecture may allow for a small white sub-pixel 708. In some embodiments, such an architecture may allow low luminance applications (e.g., night vision video applications) needing white to drive just the white sub-pixels 708. In some embodiments, such an architecture may allow for the red, green, blue, and white sub-pixels 702, 704, 706, 708 to all be driven to a same size line widths. In some embodiments, such an architecture may allow for reduced video bandwidth for white only display. In some embodiments, such an architecture may allow for a large monochrome subpixel for maximum pixel brightness for that color, while other color subpixel arrangement allows for those colors to be driven bright. In some embodiments, such an architecture may provide best resolution for green as depicted, such that the central large pixel has the best resolution. In some embodiments, the central large sub-pixel could be reduced in size and corner sub-pixels increased in size.

Figure 8:
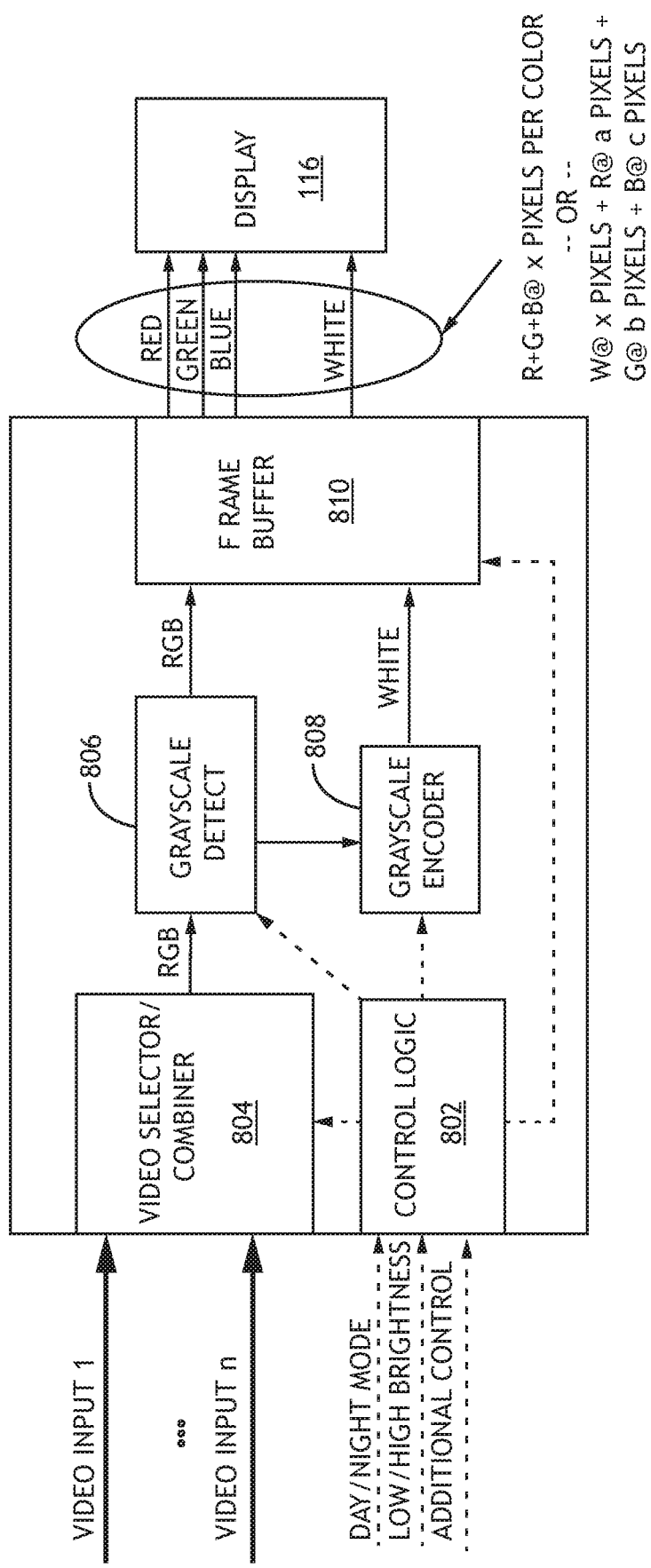
FIG. 8 is a view of an exemplary embodiment of a portion of the HMD of FIGS. 1 and 2 according to the inventive concepts disclosed herein.

Referring now to FIG. 8, an exemplary embodiment of a portion of the system of FIG. 1 according to the inventive concepts disclosed herein is depicted. For example, as shown in FIG. 8, the HMD 102 may include a reduced bandwidth RGB+W architecture. While FIGS. 8-9 exemplarily disclose an RGB+W architecture, some embodiments may include any suitable RGB plus grayscale (e.g., white grayscale or green grayscale) architecture where the grayscale may be driven by dimmer sub-pixels (e.g., green or white dimmer sub-pixels). Such reduced bandwidth RGB+W architecture may include control logic 802, a video selector/combiner 804, a grayscale detector 806, a grayscale encoder 808, a memory (e.g., a frame buffer 810), and/or the display element 116, some or all of which may be communicatively coupled. In some embodiments, each of the control logic 802, the video selector/combiner 804, the grayscale detector 806, and/or the grayscale encoder 808 may be implemented as a portion of the at least one processor 110, and/or the control logic 802, the video selector/combiner 804, the grayscale detector 806, and/or the grayscale encoder 808 may be implemented as separate processors of the at least one processor 110.

The control logic 802 may be configured to control whether the system, the display element 116, and/or the at least one processor 110 operates in a day mode or night mode. The control logic 802 may be further configured to control a brightness of the display element 116, such as based on a detected luminance of the environment. The control logic 802 may be further configured to control other operations of the system, the display element 116, and/or the at least one processor 110. The control logic 802 may be further configured to output control settings to the video selector/combiner 804, the grayscale detector 806, and/or the grayscale encoder 808.

The video selector/combiner 804 may be configured to receive one or more video inputs at any given time, such as an RGB video (e.g., synthetic vision system video), AR content video, and/or night vision video, and to receive control settings. The video selector/combiner 804 may be further configured to select one or more of the received video inputs such as based on a received control setting from the control logic 802, and if two or video inputs are selected, the video selector/combiner 804 may be further configured to combine the video inputs and output the combined video to the grayscale detector 806.

The grayscale detector 806 may be configured to, based on control settings, detect grayscale video (e.g., night vision grayscale video used in night mode) and pass the video to the grayscale encoder. In some embodiments, the grayscale detector 806 may be further configured to re-encode RGB video to lower pixel resolution depending on a control setting. The grayscale detector 806 may output RGB video to the frame buffer 810, which may be passed to the display element 116. In some embodiments, the grayscale detector 806 may be configured to detect grayscale (e.g., based on control settings) or simply pass the RGB video to the frame buffer 810 without performing grayscale detection (e.g., based on control settings).

The grayscale encoder 808 may be configured to convert RGB video to grayscale video to be displayed by the white sub-pixels 708. The grayscale encoder 808 may output grayscale video to the frame buffer 810, which may be passed to the display element 116.

The frame buffer 810 may receive RGB video and/or grayscale video. If both the RGB video and the grayscale video are received, the display element 116 may display enhanced RGB+W video. In some embodiments, based on a control setting, the frame buffer may only receive RGB video or grayscale video to be displayed by the display element 116.

In some embodiments, the architecture of FIG. 8 may be scaled to add or subtract a total number of sub-pixels as well as any combination of colors.

Figure 9:
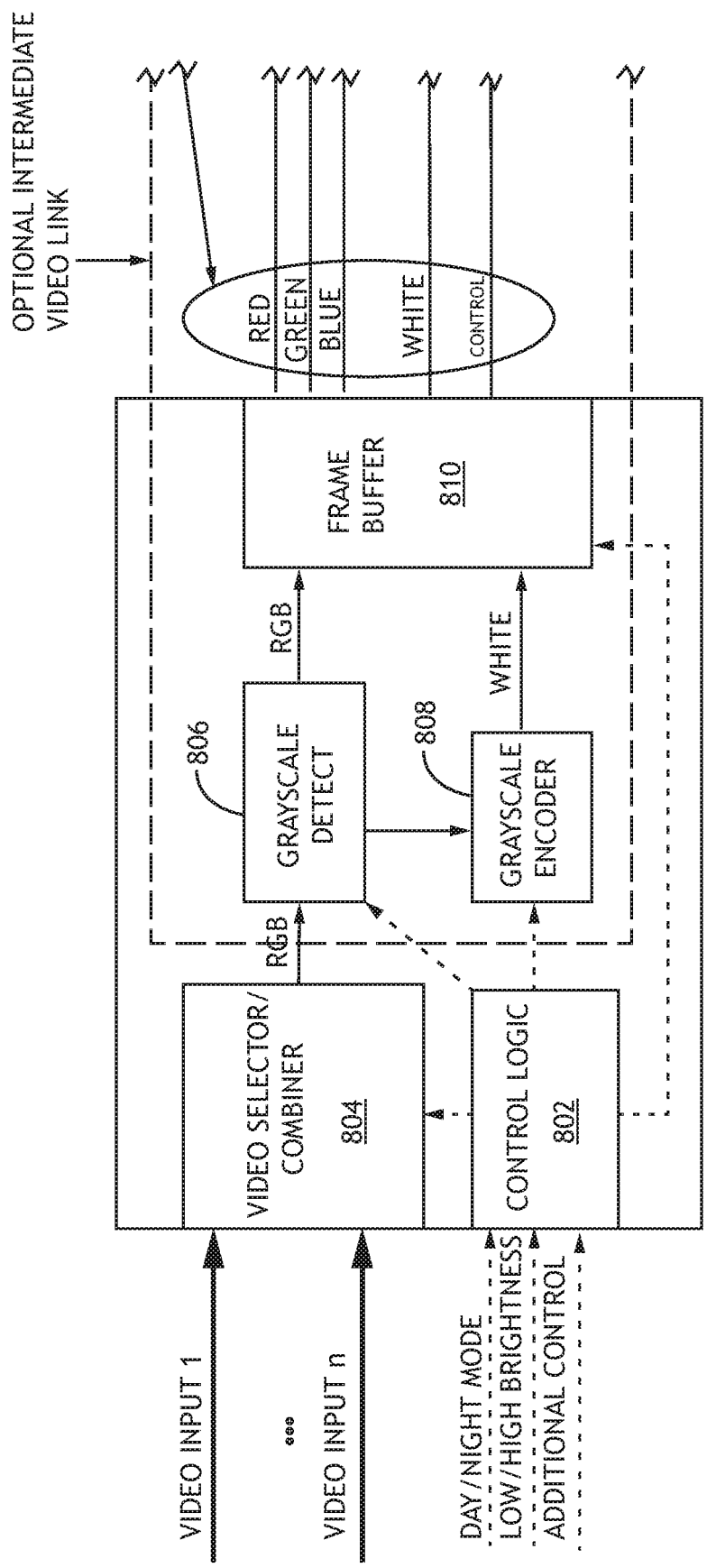
FIG. 9 is a view of an exemplary embodiment of a portion of the HMD of FIGS. 1 and 2 according to the inventive concepts disclosed herein.
Figure 9:
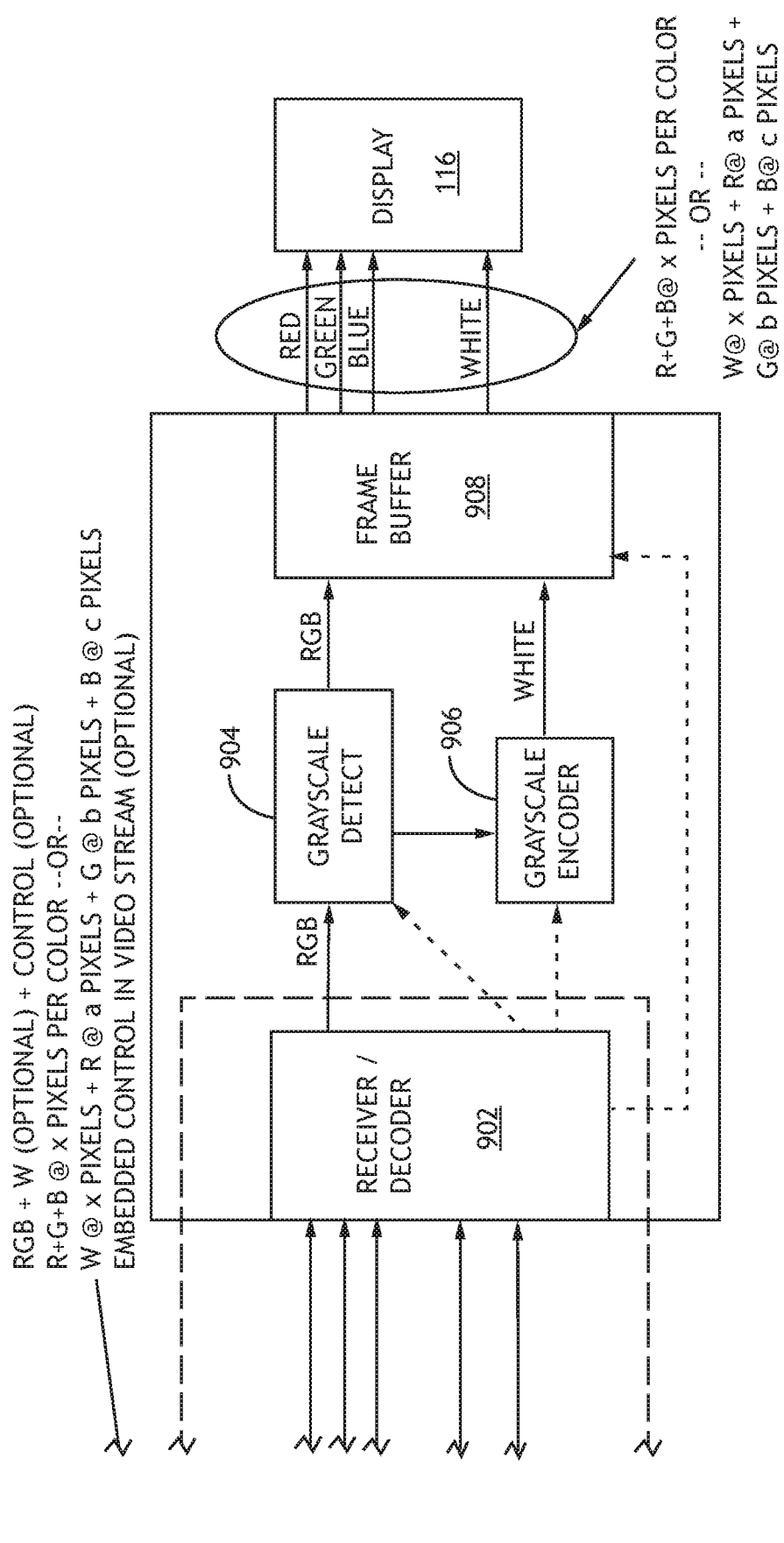

Referring now to FIG. 9, an exemplary embodiment of a portion of the system of FIG. 1 according to the inventive concepts disclosed herein is depicted. For example, as shown in FIG. 9, the HMD 102 may include a scalable reduced bandwidth RGB+W architecture. Such architecture may include control logic 802, a video selector/combiner 804, a grayscale detector 806, a grayscale encoder 808, a memory (e.g., a frame buffer 810), receiver/decoder 902, a grayscale detector 904, a grayscale encoder 906, a memory (e.g., a frame buffer 902), and/or the display element 116, some or all of which may be communicatively coupled. In some embodiments, each of the control logic 802, the video selector/combiner 804, the grayscale detector 806, the grayscale encoder 808, the receiver/decoder 902, the grayscale detector 904, and/or the grayscale encoder 906 may be implemented as a portion of the at least one processor 110, and/or the control logic 802, the video selector/combiner 804, the grayscale detector 806, the grayscale encoder 808, the receiver/decoder 902, the grayscale detector 904, and/or the grayscale encoder 906 may be implemented as separate processors of the at least one processor 110. The elements of FIG. 9 may be implemented similarly and function similarly to the elements of FIG. 8, except that the scalable reduced bandwidth RGB+W architecture of FIG. 9 is scalable to allow for an optional intermediate video link. The optional intermediate video link may allow for scalability using the same architecture and may add optional control data within the video stream, which may be used to pass control data to a downstream video processor of the at least one processor 110.

Figure 10:
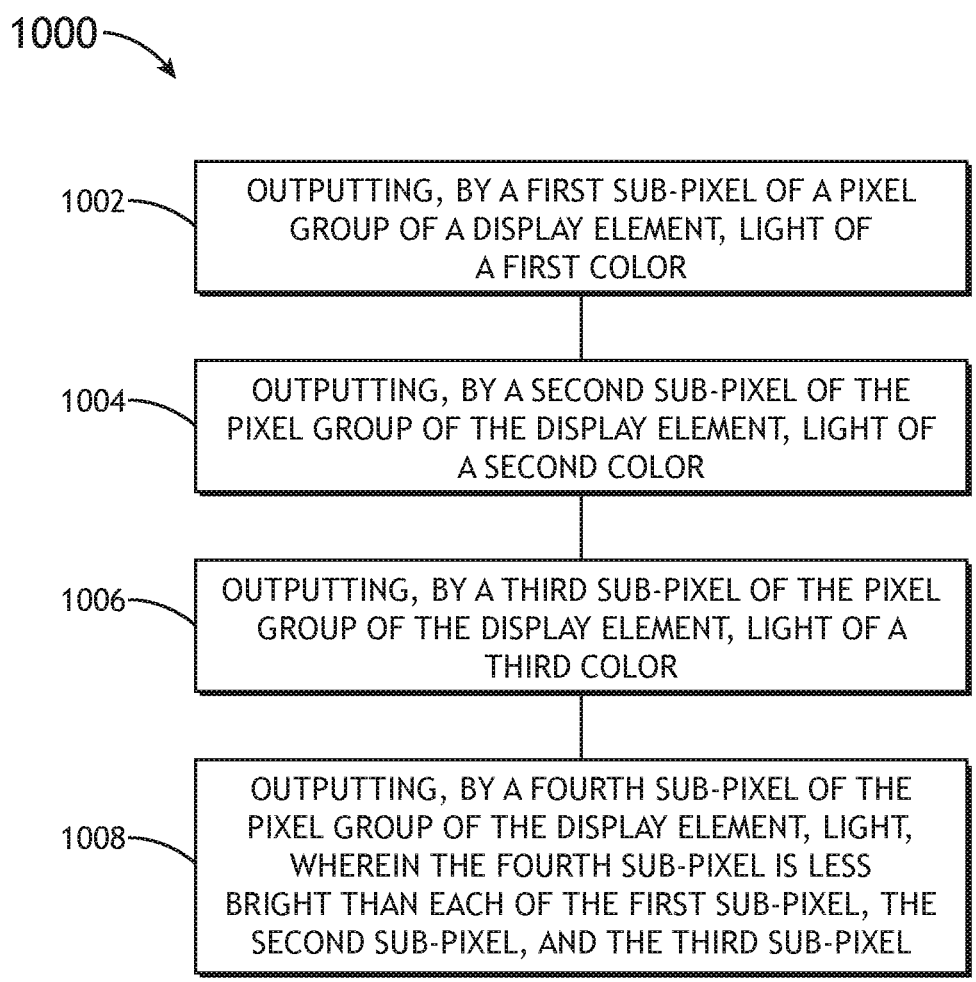
FIG. 10 is a diagram of an exemplary embodiment of a method according to the inventive concepts disclosed herein.

Referring now to FIG. 10, an exemplary embodiment of a method 1000 according to the inventive concepts disclosed herein may include one or more of the following steps. Additionally, for example, some embodiments may include performing one more instances of the method 1000 iteratively, concurrently, and/or sequentially. Additionally, for example, at least some of the steps of the method 1000 may be performed in parallel and/or concurrently. Additionally, in some embodiments, at least some of the steps of the method 1000 may be performed non-sequentially.

A step 1002 may include outputting, by a first sub-pixel of a pixel group of a display element, light of a first color.

A step 1004 may include outputting, by a second sub-pixel of the pixel group of the display element, light of a second color.

A step 1006 may include outputting, by a third sub-pixel of the pixel group of the display element, light of a third color.

A step 1008 may include outputting, by a fourth sub-pixel of the pixel group of the display element, light, wherein the fourth sub-pixel is less bright than each of the first sub-pixel, the second sub-pixel, and the third sub-pixel.

Further, the method 1000 may include any of the operations disclosed throughout.

As will be appreciated from the above, embodiments of the inventive concepts disclosed herein may be directed to a method and a system including a display element, wherein the display element includes a plurality of pixel groups such that each pixel group has a sub-pixel that is less efficient than other sub-pixels of the pixel group.

As used throughout and as would be appreciated by those skilled in the art, "at least one non-transitory computer-readable medium" may refer to as at least one non-transitory computer-readable medium (e.g., e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a display element, comprising:
a plurality of pixel groups, each of the plurality of pixel groups comprising:
a first sub-pixel configured to output light of a first color;
a second sub-pixel configured to output light of a second color;
a third sub-pixel configured to output light of a third color; and
a fourth sub-pixel configured to output light, wherein the fourth sub-pixel has a maximum brightness that is dimmer than a maximum brightness of each of the first sub-pixel, the second sub-pixel, and the third sub-pixel; and
at least one processor communicatively coupled to the display element, the at least one processor configured to: operate in a day mode and a night mode; when in the day mode, the at least one processor is further configured to drive some or all of the first, second, and third pixels corresponding to multicolor video; and when in the night mode, the at least one processor is further configured to receive night vision grayscale video, and drive some or all of the fourth sub-pixels corresponding to the night vision grayscale video such that night vision grayscale images are displayed.

2. The system of claim 1, wherein the fourth sub-pixel has a maximum brightness that is at least four times dimmer than a maximum brightness of each of the first sub-pixel, the second sub-pixel, and the third sub-pixel.

3. The system of claim 1, wherein the fourth sub-pixel is a white sub-pixel configured to output white light.

4. The system of claim 1, wherein the first sub-pixel is a red sub-pixel configured to output red light, wherein the second sub-pixel is a green sub-pixel configured to output green light, wherein the third sub-pixel is a blue sub-pixel configured to output blue light, wherein the fourth sub-pixel is another green sub-pixel configured to output green light.

5. The system of claim 1, wherein the at least one processor is further configured to: receive grayscale video; and drive some or all of the fourth sub-pixels corresponding to the grayscale video such that grayscale images are displayed.

6. The system of claim 1, wherein the at least one processor is further configured to: receive red green blue (RGB) video; encode the RGB video as grayscale video; and drive some or all of the fourth sub-pixels corresponding to the grayscale video such that grayscale images are displayed.

7. The system of claim 1, wherein the first sub-pixel is a red sub-pixel configured to output red light, wherein the second sub-pixel is a green sub-pixel configured to output green light, wherein the third sub-pixel is a blue sub-pixel configured to output blue light, wherein the at least one processor is further configured to: receive red green blue (RGB) video; encode the RGB video as grayscale video; and drive some or all of the red, green, and blue pixels corresponding to the RGB video and some or all of the fourth sub-pixels corresponding to the grayscale video such that enhanced RGB plus grayscale images are displayed.

8. The system of claim 1, wherein the first sub-pixel is a red sub-pixel configured to output red light, wherein the second sub-pixel is a green sub-pixel configured to output green light, wherein the third sub-pixel is a blue sub-pixel configured to output blue light, when in the day mode, the at least one processor is further configured to receive the multicolor video as red green blue (RGB) video, encode the RGB video as grayscale video, and drive some or all of the red, green, and blue pixels corresponding to the RGB video and some or all of the fourth sub-pixels corresponding to the grayscale video such that enhanced RGB plus grayscale images are displayed.

9. The system of claim 1, further comprising an optical system, the optical system comprising the display element.

10. The system of claim 9, further comprising a head-up display (HUD), the HUD comprising the optical system.

11. The system of claim 9, further comprising a head wearable device, the head wearable device comprising the optical system.

12. The system of claim 11, wherein the head wearable device is a near-eye display.

13. The system of claim 11, wherein the head wearable device is a helmet-mounted display (HMD).

14. The system of claim 13, wherein the HMD further comprises an eye tracking system, a head tracking system, at least one night vision sensor, at least one HMD processor, and a visor.

15. A method, comprising:
   outputting, by a first sub-pixel of a pixel group of a display element, light of a first color;
   outputting, by a second sub-pixel of the pixel group of the display element, light of a second color;
   outputting, by a third sub-pixel of the pixel group of the display element, light of a third color;
   outputting, by a fourth sub-pixel of the pixel group of the display element, light, wherein the fourth sub-pixel has a maximum brightness that is dimmer than a maximum brightness of each of the first sub-pixel, the second sub-pixel, and the third sub-pixel;
   operating, by at least one processor communicatively coupled to the display element, in a day mode and a night mode;
   when in the day mode, driving, by the at least one processor, some or all of the first, second, and third pixels corresponding to multicolor video; and
   when in the night mode, receiving, by the at least one processor, night vision grayscale video, and driving, by the at least one processor, some or all of the fourth sub-pixels corresponding to the night vision grayscale video such that night vision grayscale images are displayed.

* * * * *